(12) United States Patent
Miyai et al.

(10) Patent No.: US 11,046,352 B2
(45) Date of Patent: Jun. 29, 2021

(54) STEERING COLUMN

(71) Applicants: JTEKT CORPORATION, Osaka (JP); FUJI KIKO CO., LTD., Shizuoka (JP)

(72) Inventors: Hidekazu Miyai, Kosai (JP); Osamu Fujimura, Hamamatsu (JP); Yota Uesaka, Toyohashi (JP); Yasuhiro Tanioka, Kashihara (JP); Akio Osuka, Toyokawa (JP); Takuya Suzuki, Kashihara (JP)

(73) Assignees: JTEKT CORPORATION, Osaka (JP); FUJI KIKO CO., LTD., Shizuoka (JP)

( * ) Notice: Subject to any disclaimer, the term of this patent is extended or adjusted under 35 U.S.C. 154(b) by 49 days.

(21) Appl. No.: 16/415,201

(22) Filed: May 17, 2019

(65) Prior Publication Data
US 2019/0359245 A1  Nov. 28, 2019

(30) Foreign Application Priority Data

May 23, 2018 (JP) .............................. JP2018-098472

(51) Int. Cl.
*B62D 1/19* (2006.01)

(52) U.S. Cl.
CPC .................................... *B62D 1/195* (2013.01)

(58) Field of Classification Search
CPC .................................................... B62D 1/195
See application file for complete search history.

(56) References Cited

U.S. PATENT DOCUMENTS

| | | | |
|---|---|---|---|
| 7,228,755 B2* | 6/2007 | Armstrong | B62D 1/195 280/777 |
| 7,472,924 B2* | 1/2009 | Ikegaya | B62D 1/19 280/777 |
| 8,430,428 B2* | 4/2013 | Tinnin | B62D 1/195 280/779 |

(Continued)

FOREIGN PATENT DOCUMENTS

| | | |
|---|---|---|
| CN | 202481129 U | 10/2012 |
| CN | 204527287 U | 8/2015 |

(Continued)

OTHER PUBLICATIONS

Oct. 8, 2019 Extended Search Report issued in European Patent Application No. 19175628.7.

*Primary Examiner* — Faye M Fleming
(74) *Attorney, Agent, or Firm* — Oliff PLC

(57) ABSTRACT

A steering column includes: a cylindrical member that holds a steering shaft in such a manner as to allow extension and contraction of the steering shaft; a holding member that holds the cylindrical member; a fixture member that is fixed to a vehicle body; a coupling member that couples the fixture member and the holding member; and an energy absorbing member that is partially fixed to the holding member. The coupling member uncouples the fixture member and the holding member when the holding member moves forward for a specified distance in an axial direction. The fixture member has an engaging section arranged at a position where the engaging section is engaged with an engaged section of the energy absorbing member when the holding member moves forward for the specified distance or longer in the axial direction.

9 Claims, 8 Drawing Sheets

(56) References Cited

U.S. PATENT DOCUMENTS

| | | | | |
|---|---|---|---|---|
| 8,678,436 B2* | 3/2014 | Duffy | .................... | B62D 1/195 |
| | | | | 280/777 |
| 8,764,064 B2* | 7/2014 | Riefe | .................... | B62D 1/195 |
| | | | | 280/777 |
| 8,998,258 B2* | 4/2015 | Kwon | .................... | B62D 1/195 |
| | | | | 280/777 |
| 9,139,220 B2* | 9/2015 | Hong | .................... | B62D 1/195 |
| 2005/0263997 A1 | 12/2005 | Tokioka | | |
| 2005/0269812 A1 | 12/2005 | Yamada | | |
| 2009/0090210 A1* | 4/2009 | Menjak | ................ | B62D 1/195 |
| | | | | 74/492 |
| 2012/0319388 A1 | 12/2012 | Ishii et al. | | |
| 2014/0150595 A1* | 6/2014 | Riefe | .................... | B62D 1/195 |
| | | | | 74/492 |

FOREIGN PATENT DOCUMENTS

| | | | |
|---|---|---|---|
| EP | 2818385 | A1 | 12/2014 |
| JP | 2006-008114 | A | 1/2006 |
| JP | 2008-037224 | A | 2/2008 |
| JP | 2015-009685 | A | 1/2015 |

\* cited by examiner

STEERING COLUMN

INCORPORATION BY REFERENCE

The disclosure of Japanese Patent Application No. 2018-098472 filed on May 23, 2018 including the specification, drawings and abstract is incorporated herein by reference in its entirety.

BACKGROUND

1. Technical Field

The disclosure relates to a steering column.

2. Description of Related Art

A mechanism that absorbs impact on a driver during a secondary collision, in which the driver collides with a steering wheel due to a collision of a vehicle, is requested for a steering column. For example, in Japanese Patent Application Publication No. 2015-9685 (JP 2015-9685 A), a steering device including an absorbing member that absorbs impact energy during the secondary collision is disclosed. This steering device includes an upper bracket, an engaging section that integrally moves with the upper bracket, a fixture section, and the absorbing member. The fixture section is fixed to a vehicle body by a bolt, and thus relative positions thereof in the vehicle body before and after the secondary collision is fixed. The absorbing member includes: a fixed section that is fixed to the fixture section; an engaged section that opposes the engaging section; a coupling section that couples the fixed section and the engaged section; and an idle section. The idle section causes the engaged section to be disposed in such a manner as to keep a specified idle distance from the engaging section. During the secondary collision, the upper bracket moves in a specified moving direction. The absorbing member absorbs the energy in the secondary collision when the coupling section is deformed by engagement of the engaging section and the engaged section.

SUMMARY

In the steering device described above, the upper bracket in a separable state from the fixture section (a capsule) is fastened with the capsule to the vehicle body by the bolt. The capsule and the upper bracket are further coupled to each other by a resin pin. In such a structure, the upper bracket moves when the secondary collision occurs. Consequently, the resin pin is ruptured, and the upper bracket separates from the capsule. Then, the engaging section of the moving upper bracket is engaged with the absorbing member. In this way, the absorbing member absorbs the impact energy generated by the secondary collision.

However, as in the structure described above, in a structure in which a member (a moving member), which is unfixed from the vehicle body and moves by the impact during the secondary collision, is engaged with the absorbing member, engaged portions of the moving member and the absorbing member move with respect to the vehicle body. For such a reason, it is difficult to secure a stable engaged state between the moving member and the absorbing member during the secondary collision, for example.

The disclosure provides a steering column capable of performing appropriate impact absorbing operation with a simple configuration.

A steering column according to one aspect of the disclosure is a steering column provided in a vehicle body. The steering column includes a cylindrical member, a holding member, a fixture member, a coupling member, and an energy absorbing member. The cylindrical member holds a steering shaft in such a manner as to allow extension and contraction of the steering shaft to the front in an axial direction. The holding member holds the cylindrical member. The fixture member is fixed to the vehicle body. The coupling member is configured to couple the fixture member and the holding member. The coupling member is configured to uncouple the fixture member and the holding member when the holding member moves forward for a specified distance in the axial direction. The energy absorbing member is partially fixed to the holding member. The fixture member has an engaging section arranged at a position where the engaging section is engaged with the engaged section of the energy absorbing member in the case where the holding member moves forward for the specified distance or longer in the axial direction during a secondary collision.

In the steering column, the engaging section may be provided in such a manner as to be projected from the fixture member. The engaged section may be an opening provided in the energy absorbing member. The engaging section may be arranged in such a manner as to extend through the opening. The opening may be in such size that a clearance is provided between the opening and a rear side of the engaging section in the axial direction. On a portion of the engaging section that is exposed from the opening, a head that has a larger portion than the opening when seen in a projected direction of the engaging section may be provided, and the head may be arranged separately from a peripheral edge of the opening in the projected direction.

In the steering column, the head may be a head of a bolt that fixes the fixture member to the vehicle body by fastening the fixture member and the vehicle body. The engaging section may have a through hole that causes a shaft section of the bolt to extend through the engaging section in the projected direction. The energy absorbing member may have a plate shape. A projection length of the engaging section from the fixture member may be greater than a thickness of the peripheral edge of the opening in the energy absorbing member.

In the steering column, the engaging section may include a circular tube member. The circular tube member may be provided in an attachment hole provided in the fixture member such that a part of the circular tube member in a tube axial direction is projected from the fixture member. The shaft section of the bolt may be arranged to extend through the circular tube member in the tube axial direction.

In the steering column, the engaging section may be a step of a stepped bolt that fixes the fixture member to the vehicle body by fastening the fixture member and the vehicle body. The head may be a head of the stepped bolt. The energy absorbing member may have a plate shape. A thickness of the step in an axial direction of the stepped bolt may be greater than a thickness of the peripheral edge of the opening in the energy absorbing member.

In the steering column, a convex section that is projected toward the head or the fixture member may be formed on the peripheral edge of the opening in the energy absorbing member.

In the steering column, the energy absorbing member may include an annular section having the opening. The annular section may have a curved or bent shape to be projected toward the head or the fixture member.

The steering column described above can perform appropriate impact absorbing operation with a simple configuration.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
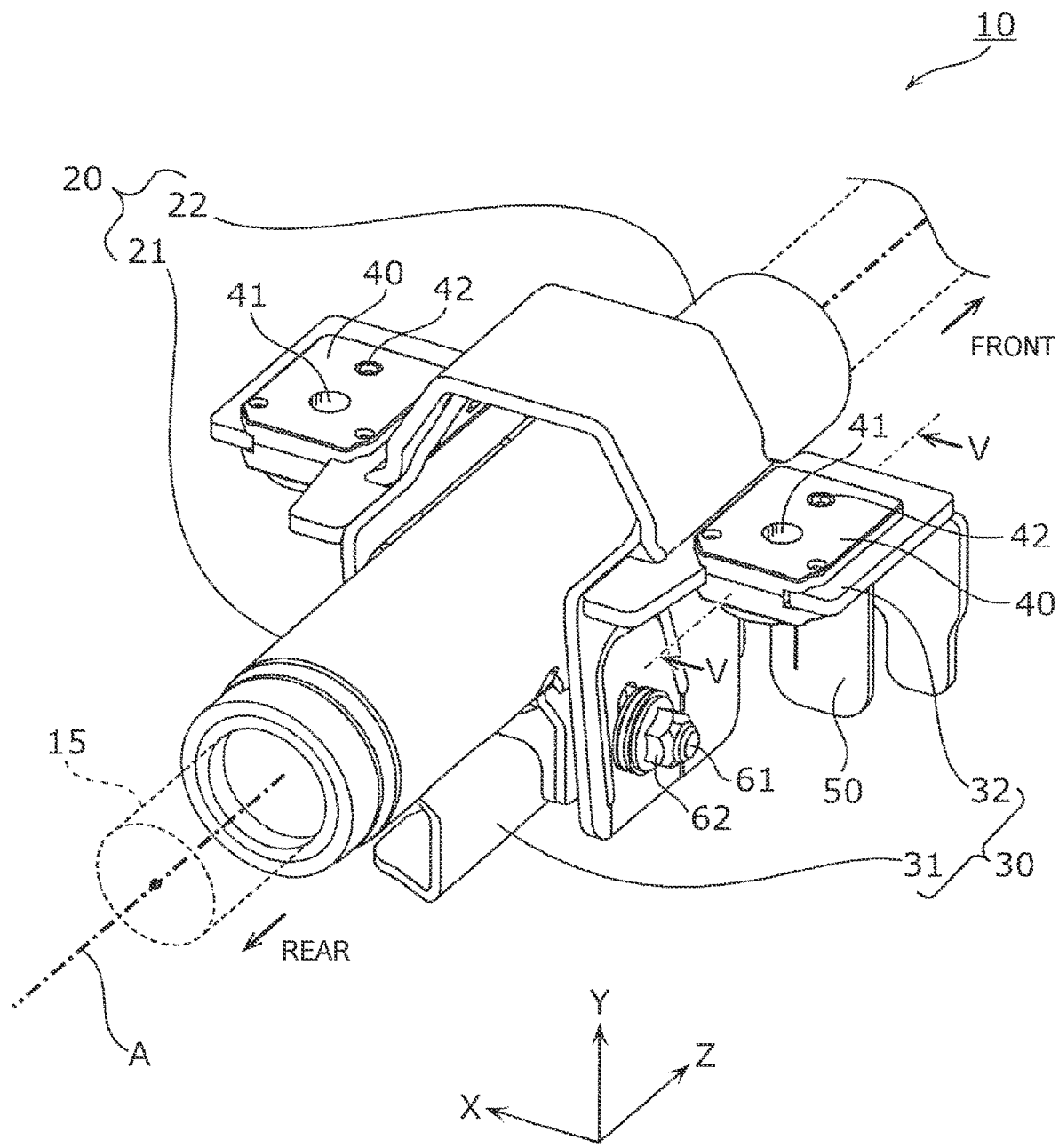
FIG. 1 is a perspective view of external appearance of a steering column according to an embodiment.

A specific description will hereinafter be made on an embodiment and modified embodiments thereof with reference to the drawings. Note that the embodiment and the modified embodiments, which will be described below, each illustrate a comprehensive or specific example. Numerical values, shapes, materials, constituent elements, arranged positions and coupled states of the constituent elements, steps, orders of steps described in the embodiment and the modified embodiments below are merely examples and thus have no intention to limit the invention. In addition, of the constituent elements described in the embodiment and the modified embodiments below, the constituent elements that are not described in the independent claim having the highest concept will be described as optional constituent elements.

Each of the drawings is a schematic view in which the constituent elements are appropriately exaggerated, omitted, or adjusted for a ratio to illustrate the disclosure, and thus shapes, positional relationships, and the ratios of the constituent elements shown in the drawings may differ from the actual shapes, the actual positional relationships, and the actual ratios thereof. Furthermore, there is a case where expressions indicating relative directions and postures, such as parallel and orthogonal, are used in the embodiment and the claims described below. However, each of such expressions also includes the relative direction or the posture not strictly corresponding to the relative direction or the posture indicated by the expression. For example, an expression that two directions are parallel to each other not only means that the two directions are completely parallel to each other but also means that the two directions are substantially parallel to each other, that is, a few percent of a difference is also included, for example.

Embodiment

Figure 2:
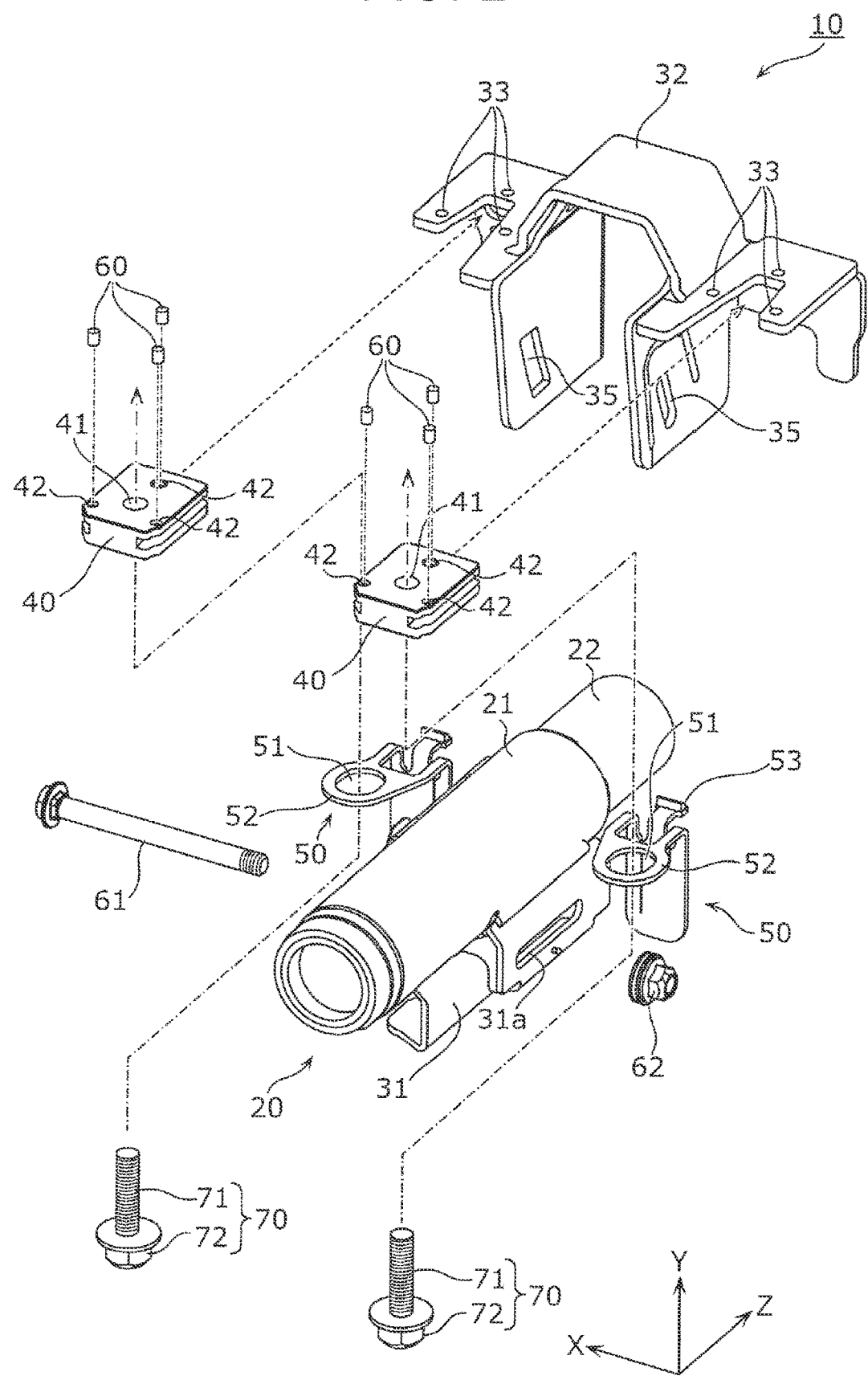
FIG. 2 is an exploded perspective view of the steering column according to the embodiment.

A description will first be made on an overall configuration of a steering column 10 according to the embodiment with reference to FIG. 1 and FIG. 2. FIG. 1 is a perspective view of external appearance of the steering column 10 according to the embodiment. FIG. 2 is an exploded perspective view of the steering column 10 according to the embodiment.

In FIG. 1, an approximate shape and an approximate arranged position of a steering shaft 15 are indicated by dotted lines. In FIG. 2, the steering shaft 15 is not shown. A one-dot chain line in FIG. 1 represents a rotation axis A (a virtual axis) of the steering shaft 15. In this embodiment, the rotation axis A is parallel to a Z-axis. Hereinafter, when an "axial direction" is simply described, the "axial direction" means a parallel direction with the rotation axis A (a Z-axis direction in this embodiment). In addition, "forward direction in the axial direction" means a direction that is parallel to the rotation axis A and is extending toward a front side of a vehicle (a positive side of the Z-axis). "Rearward direction in the axial direction" means a direction that is parallel to the rotation axis A and is extending toward a rear side of the vehicle (a negative side of the Z-axis).

The steering column 10 according to this embodiment is a device mounted on the vehicle such as an automobile, and is a device holding the steering shaft 15 that rotates when an unillustrated steering wheel is operated. The steering column 10 holds the steering shaft 15 such that an axial length and a vertical tilt of the steering shaft 15 can be adjusted by a driver's operation, for example. That is, with the steering column 10, a position and a posture of the steering wheel can be adjusted (hereinafter simply referred to as "position adjustment").

The steering shaft 15 includes, for example, an upper shaft and a lower shaft. The upper shaft is disposed rearward direction (on the steering wheel side) of the lower shaft. The upper shaft and the lower shaft are spline-fitted to each other. When the upper shaft slides in the axial direction with respect to the lower shaft, the steering shaft 15 is stretched or contracted in the axial direction. That is, the steering shaft 15 has a telescopic structure.

The steering column 10, which has the steering shaft 15 just as described, specifically includes: a cylindrical member 20 that holds the steering shaft 15 in such a manner as to allow the steering shaft 15 to be stretched or contracted; a holding member 30 that holds the cylindrical member 20; and a fixture member 40 that is fixed to a vehicle body. The fixture member 40 and the holding member 30 are coupled to each other by a coupling member 60.

In this embodiment, the cylindrical member 20 has an outer tube 21 and an inner tube 22. The holding member 30 has a holding bracket 31 on the cylindrical member 20 side and a fixture bracket 32 on the vehicle body side.

Each of the outer tube 21 and the inner tube 22 is a tube that is made of metal and extends in the axial direction. In this embodiment, the outer tube 21 is disposed rearward direction of the inner tube 22. That is, the outer tube 21 is an upper tube, and the inner tube 22 is a lower tube.

The outer tube 21 is a member that fixes the upper shaft of the steering shaft 15 in the axial direction and supports the upper shaft of the steering shaft 15 in such a manner as to allow rotation thereof. The inner tube 22 is a member that fixes the lower shaft of the steering shaft 15 in the axial direction and supports the lower shaft of the steering shaft 15 in such a manner as to allow rotation thereof. The outer tube 21 is attached to the inner tube 22 in a movable manner in the axial direction. That is, when the outer tube 21 moves in the axial direction with respect to the inner tube 22, the upper shaft of the steering shaft 15 moves in the axial direction with respect to the lower shaft. In this way, the entire steering shaft 15 is stretched or contracted in the axial direction.

The holding bracket 31 is fixed to the outer tube 21 by welding, for example. The holding bracket 31 is attached in such a manner as to be able to move and change a posture thereof with respect to the fixture bracket 32 on the vehicle body side.

More specifically, as shown in FIG. 2, when a tip of a bolt 61, which extends through an elongated hole 31a of the holding bracket 31 and an elongated hole 35 of the fixture bracket 32 in a lateral direction (an X-axis direction), is screwed to a nut 62, the fixture bracket 32 is attached to the holding bracket 31. In addition, a lever or a rotation cam, which is not shown, is arranged on a head side of the bolt 61. For example, when the lever in a lowered state is raised, the fixture bracket 32 is brought into a state of tightening the holding bracket 31 in the lateral direction. That is, the holding bracket 31 is brought into a state where a position thereof is fixed (a locked state). Furthermore, when the lever is lowered in the locked state of the holding bracket 31, the fixture bracket 32 untightens the holding bracket 31. As a result, the holding bracket 31 can move. More specifically, the elongated hole 31a of the holding bracket 31 is elongated in the axial direction. Thus, the holding bracket 31 can move in the axial direction. More specifically, the outer tube 21 can move with the holding bracket 31 in the axial direction. In this way, the steering shaft 15 is stretched or contracted. That is, a longitudinal position of the steering wheel, which is attached to a rear end of the steering shaft 15 in the axial direction, is changed (so-called "telescopic adjustment").

The elongated hole 35 of the fixture bracket 32 is elongated in the vertical direction. Thus, a vertical tilt (a tilt in a Y-Z plane) of the holding bracket 31 can be changed. More specifically, a tilt of the cylindrical member 20 is changed along with the holding bracket 31, and thus the tilt of the steering shaft 15 is also changed. As a result, an angle and a vertical position of the steering wheel, which is attached to a rear end of the steering shaft 15 in the axial direction, are changed (so-called "tilt adjustment").

As described above, the steering column 10 according to this embodiment is a device capable of adjusting the vertical (tilt) position and the longitudinal (telescopic) position of the steering wheel.

The steering column 10 including a mechanism, which performs tilt and telescopic position adjustment of the steering wheel as described above, is fixed to the vehicle body via the fixture member 40. As shown in FIG. 2, the fixture member 40 is a member that is made of the metal and has a through hole 41 through which a shaft section 71 of a bolt 70 passes. The bolt 70 that is inserted through the through hole 41 penetrates a part of the vehicle body and is screwed to a nut. In this way, the fixture member 40 is fixed to the vehicle body.

In addition, as shown in FIG. 1 and FIG. 2, the fixture member 40 is attached to the fixture bracket 32 and is coupled to the fixture bracket 32 by the coupling members 60. Each of the coupling members 60 is a pin that is made of a resin (a resin pin), for example. Each of the coupling members 60 is arranged in a state of penetrating a pin hole 42 and a pin hole 33 that are aligned vertically and respectively provided in the fixture member 40 and the fixture bracket 32. In this embodiment, the steering column 10 has a right and left pair of the fixture members 40, and each of the two fixture members 40 is coupled to the fixture bracket 32 by the three coupling members 60. That is, in this embodiment, the two fixture members 40 are coupled to the fixture bracket 32 by a total of the six coupling members 60. Each of these six coupling members 60 has strength that can endure a load generated by a normal operation for the steering column 10, such as the position adjustment of the steering wheel.

When a secondary collision occurs, these six coupling members 60 uncouple the fixture bracket 32 (the holding member 30) from the fixture members 40 by impact energy. As a result, the holding member 30 moves forward in the axial direction without being restrained by the fixture members 40. During such movement, an energy absorbing member 50, which moves with the holding member 30, is engaged with the fixture member 40, and the energy absorbing member 50 is deformed in conjunction with the movement of the holding member 30. In this way, the impact energy is absorbed. That is, the steering column 10 performs impact absorbing operation during the secondary collision by uncoupling using the coupling members 60 (shearing of the coupling members 60 in this embodiment) and the deformation of the energy absorbing member 50.

A description will hereinafter be made on a configuration of the steering column 10 related to the impact absorbing operation, and the like with reference to FIG. 1 and FIG. 2, which have been referred above, and FIG. 3 to FIG. 8.

Figure 3:
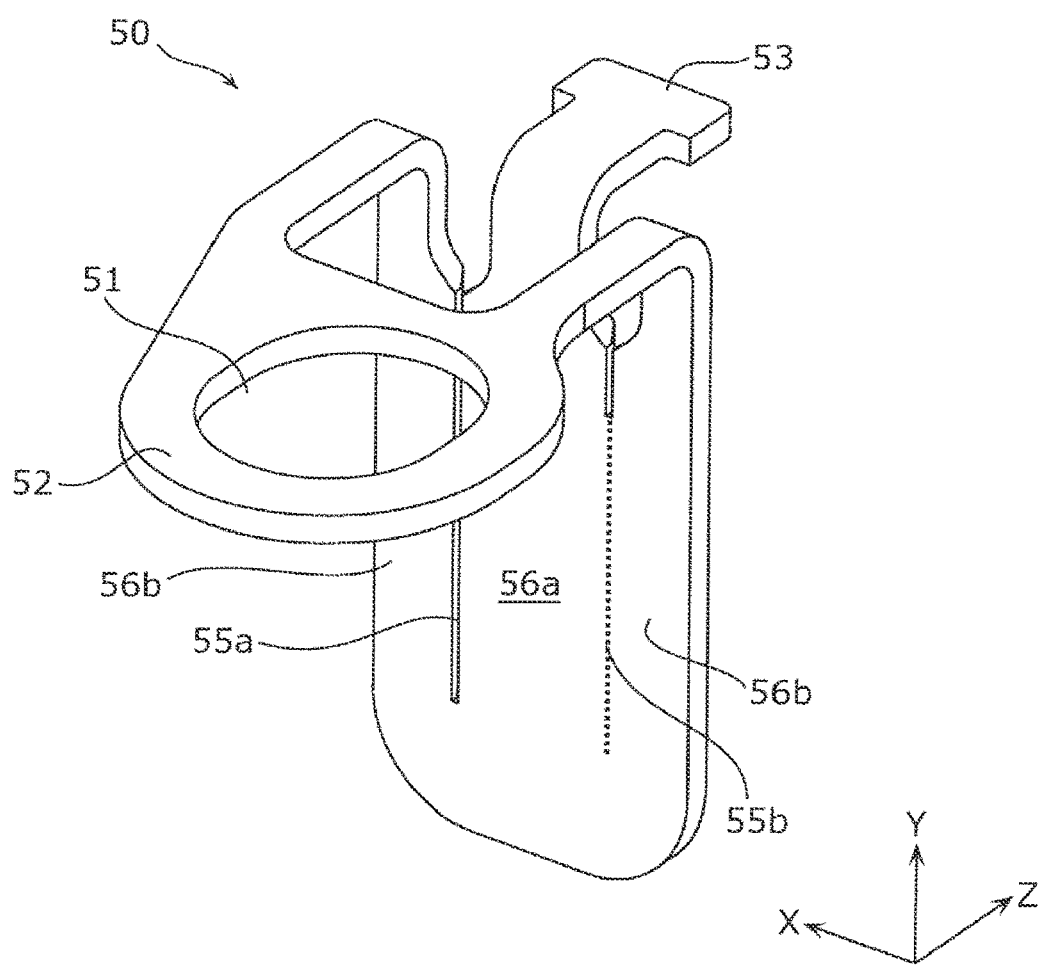
FIG. 3 is a perspective view of external appearance of an energy absorbing member according to the embodiment.
Figure 4:
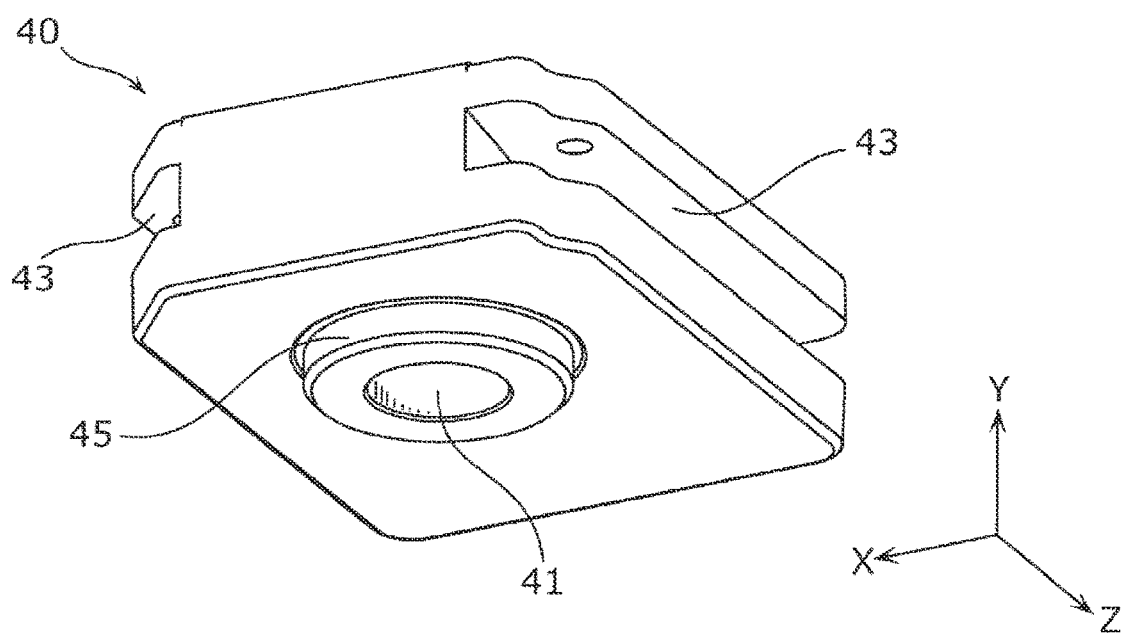
FIG. 4 is a perspective view of external appearance of a fixture member according to the embodiment.
Figure 5:
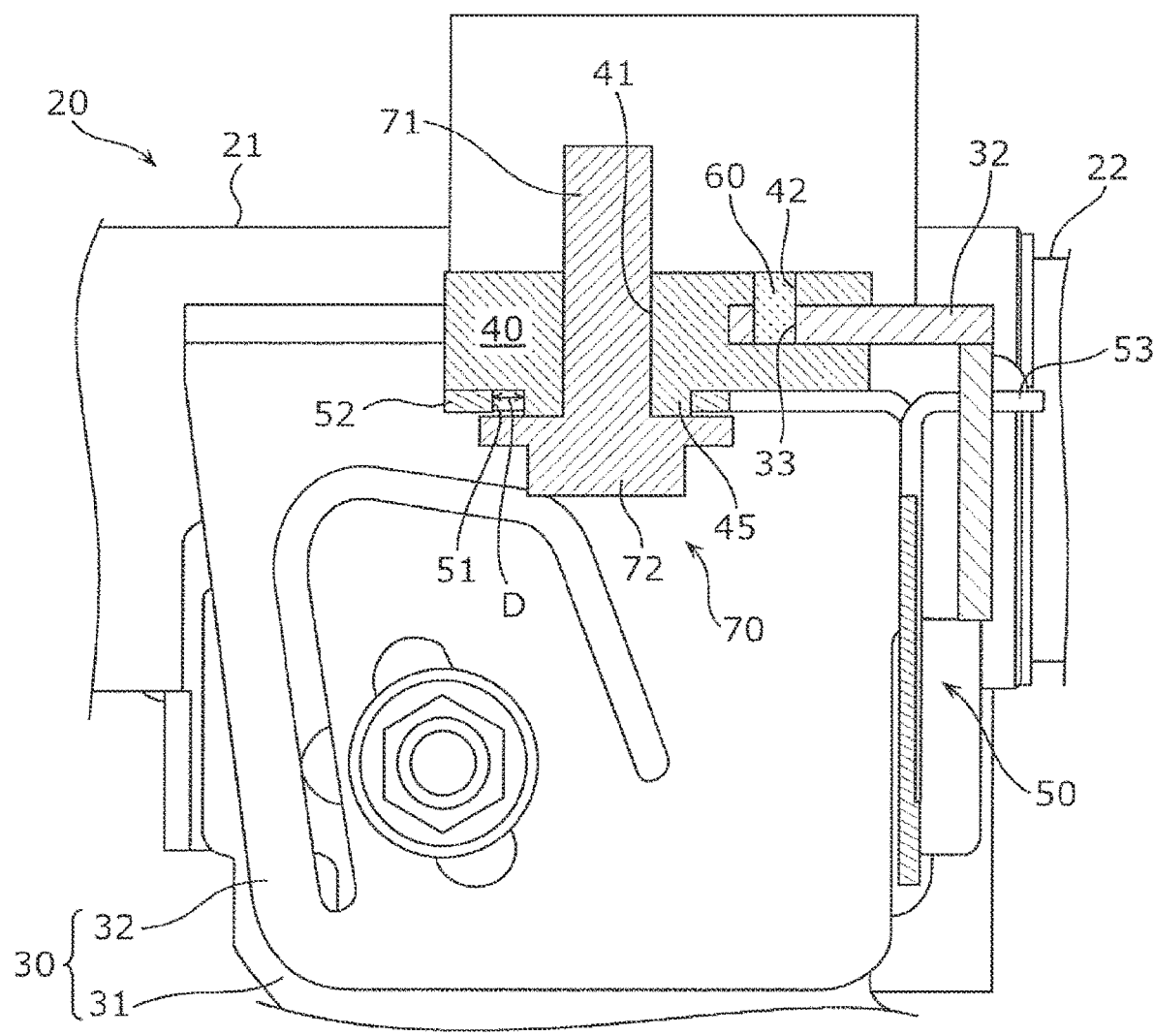
FIG. 5 is a cross-sectional view of a structure of the fixture member according to the embodiment and a periphery thereof.

FIG. 3 is a perspective view of external appearance of the energy absorbing member 50 according to the embodiment. FIG. 4 is a perspective view of external appearance of the fixture member 40 according to the embodiment. More specifically, FIG. 3 is a perspective view at the time when the energy absorbing member 50 is seen obliquely downward. FIG. 4 is a perspective view at the time when the fixture member 40 is seen obliquely upward. FIG. 5 is a cross-sectional view of a structure of the fixture member 40 according to the embodiment and a periphery thereof. More specifically, FIG. 5 shows a cross section, which is taken along line V-V in FIG. 1, in the Y-Z plane.

The energy absorbing member 50 according to this embodiment is a member that is made of the metal, and, as shown in FIG. 3, has: an annular section 52 having an opening 51; and a fixed section 53 as a portion that is fixed to the holding member 30. In this embodiment, the fixed section 53 is fixed to the fixture bracket 32 provided in the holding member 30 by welding, for example. A slit 55a and a thin section 55b are provided between the annular section 52 and the fixed section 53.

The fixture member 40 according to this embodiment is the member that is made of the metal as described above, and, as shown in FIG. 4 and FIG. 5, has the through hole 41 through which the shaft section 71 of the bolt 70 passes. The fixture member 40 is also provided with an engaging section 45, which is engaged with the energy absorbing member 50, on a surface thereof on a head 72 side of the bolt 70 (a surface on a negative side of the Y-axis).

In this embodiment, as shown in FIG. 4 and FIG. 5, the engaging section 45 is provided in a projected manner from the fixture member 40, and, as shown in FIG. 5, is arranged in a state of penetrating the opening 51 of the energy absorbing member 50. That is, in this embodiment, the opening 51 of the energy absorbing member 50 is an example of the engaged section that is engaged with the engaging section 45 of the fixture member 40.

The fixture member 40 is provided with a slide groove 43 in which the fixture bracket 32 is partially inserted. As shown in FIG. 1 and FIG. 2, by using the slide groove 43, the fixture member 40 is attached to the fixture bracket 32. Furthermore, the fixture member 40 and the fixture bracket 32 are coupled to each other by the three coupling members 60. More specifically, as shown in FIG. 5, each of the coupling members 60 is arranged in a state of penetrating a part of the fixture member 40 and a part of the fixture bracket 32.

When the secondary collision occurs, an external force in a direction to separate the annular section 52, which has the opening 51 engaged with the engaging section 45, and the fixed section 53, which is fixed to the fixture bracket 32, from each other is applied to the energy absorbing member 50. As a result, the thin section 55*b* of the energy absorbing member 50 is ruptured and deformed to open a first portion 56*a* between the slit 55*a* and the thin section 55*b* and a second portion 56*b* on an outer side of each of the slit 55*a* and the thin section 55*b* outward. Just as described, when the energy absorbing member 50 is deformed, the energy absorbing member 50 absorbs the impact energy during the secondary collision.

In this embodiment, the head 72, which has a larger portion than the opening 51 at the time when seen from a projected direction (a positive Y-axis direction) of the engaging section 45, is arranged on a portion of the engaging section 45 that is exposed from the opening 51. Since such a head 72 is stuck by a peripheral edge of the opening 51, disengagement of the opening 51 from the engaging section 45 is prevented.

In this embodiment, the through hole 41 is provided in the engaging section 45. That is, the engaging section 45 has the through hole 41 that causes the shaft section 71 of the bolt 70 to extend through the engaging section 45 in the projected direction of the engaging section 45. Accordingly, the head 72 of the bolt 70 has a function of preventing the disengagement of the opening 51 from the engaging section 45.

In addition, in the projected direction of the engaging section 45, the head 72 is separately arranged from the peripheral edge of the opening 51 in the energy absorbing member 50. That is, in the case where the fixture member 40 is fixed to the vehicle body by the bolt 70, the head 72 of the bolt 70 is in a state of not pressing the peripheral edge of the opening 51. Furthermore, as shown in FIG. 5, the opening 51 of the energy absorbing member 50 is provided in such size that a clearance having a distance D (hereinafter referred to as a "clearance D") at the rear of the engaging section 45 in the axial direction (in the negative Z-axis direction). That is, the opening 51 is in such size that the clearance D is provided between the opening 51 and the rear side of the engaging section 45, which is arranged to extend through the opening 51, in the axial direction. Accordingly, after moving forward in the axial direction (the positive Z-axis direction) for a distance corresponding to the clearance D, the opening 51 of the energy absorbing member 50 is engaged with the engaging section 45.

As described above, the bolt 70, which fastens the fixture member 40 to the vehicle body in the state of penetrating the energy absorbing member 50, fixes the fixture member 40 to the vehicle body in a state of not pressing the energy absorbing member 50 in an axial direction of the bolt 70 (a parallel direction to the Y-axis direction and hereinafter referred to as a "bolt-axis direction"). Furthermore, the opening 51 of the energy absorbing member 50 is provided such that the opening 51 is engaged with the engaging section 45 after moving forward in the axial direction (the positive Z-axis direction) for the specified distance with respect to the fixture member 40 fixed to the vehicle body.

A description will now be made on details of the impact absorbing operation realized by the fixture member 40, the holding member 30 (the fixture bracket 32), and the energy absorbing member 50 with reference to FIG. 6 to FIG. 8.

Figure 6:
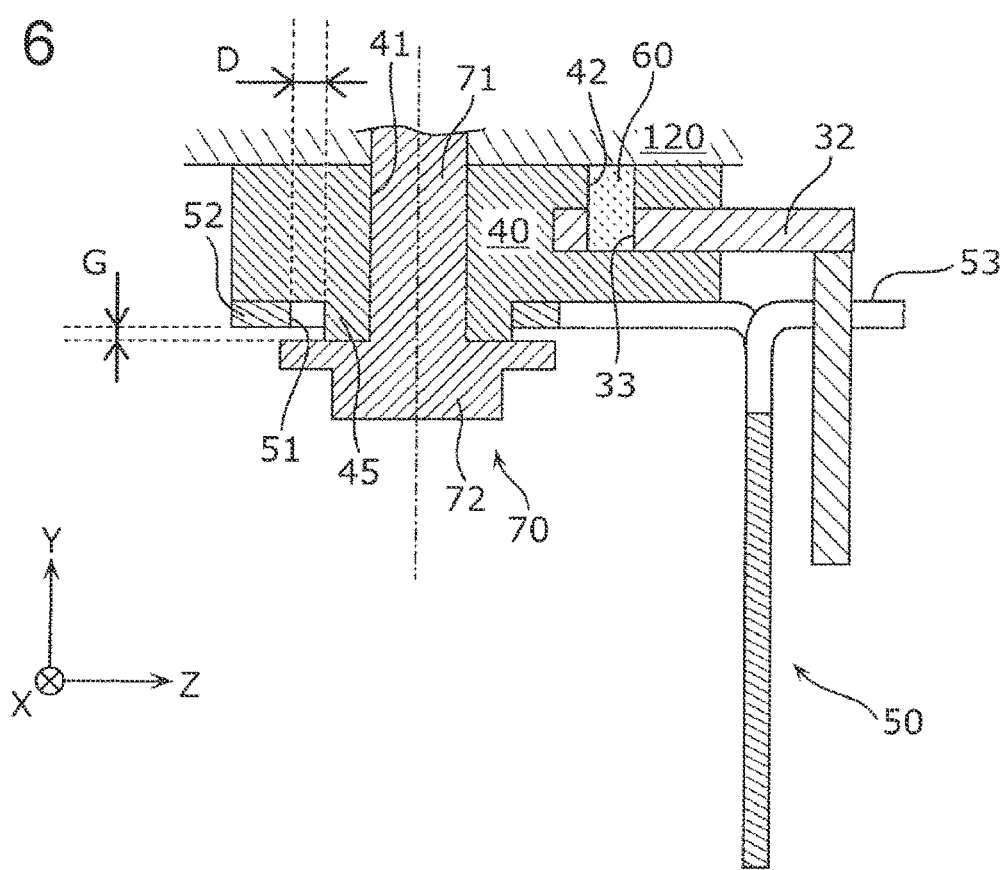
FIG. 6 is a view of the structure of the fixture member and the periphery thereof during a normal time.

FIG. 6 is a view of the structure of the fixture member 40 and the periphery thereof during a normal time. FIG. 7 is a view of the structure of the fixture member 40 and the periphery thereof immediately after the secondary collision. FIG. 8 is a view of the structure of the fixture member 40 and the periphery thereof after the energy absorbing member 50 starts being deformed.

Figure 7:
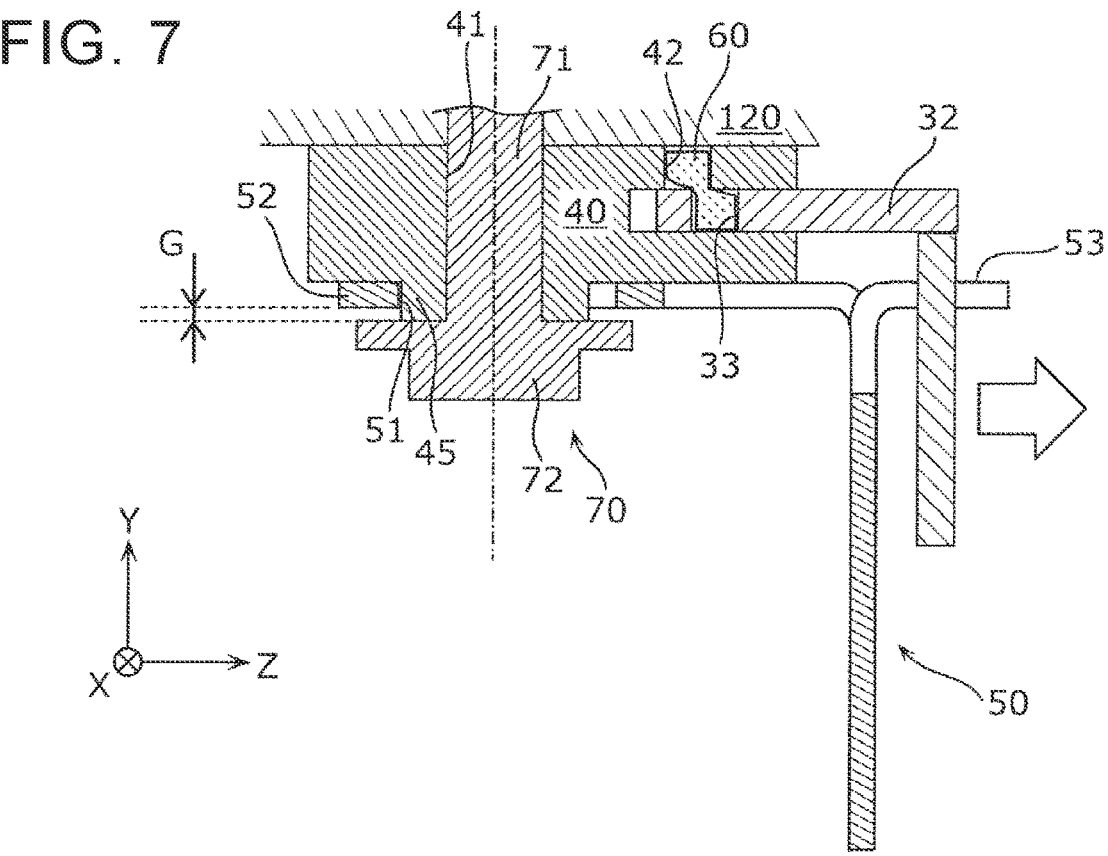
FIG. 7 is a view of the structure of the fixture member and the periphery thereof immediately after a secondary collision.
Figure 8:
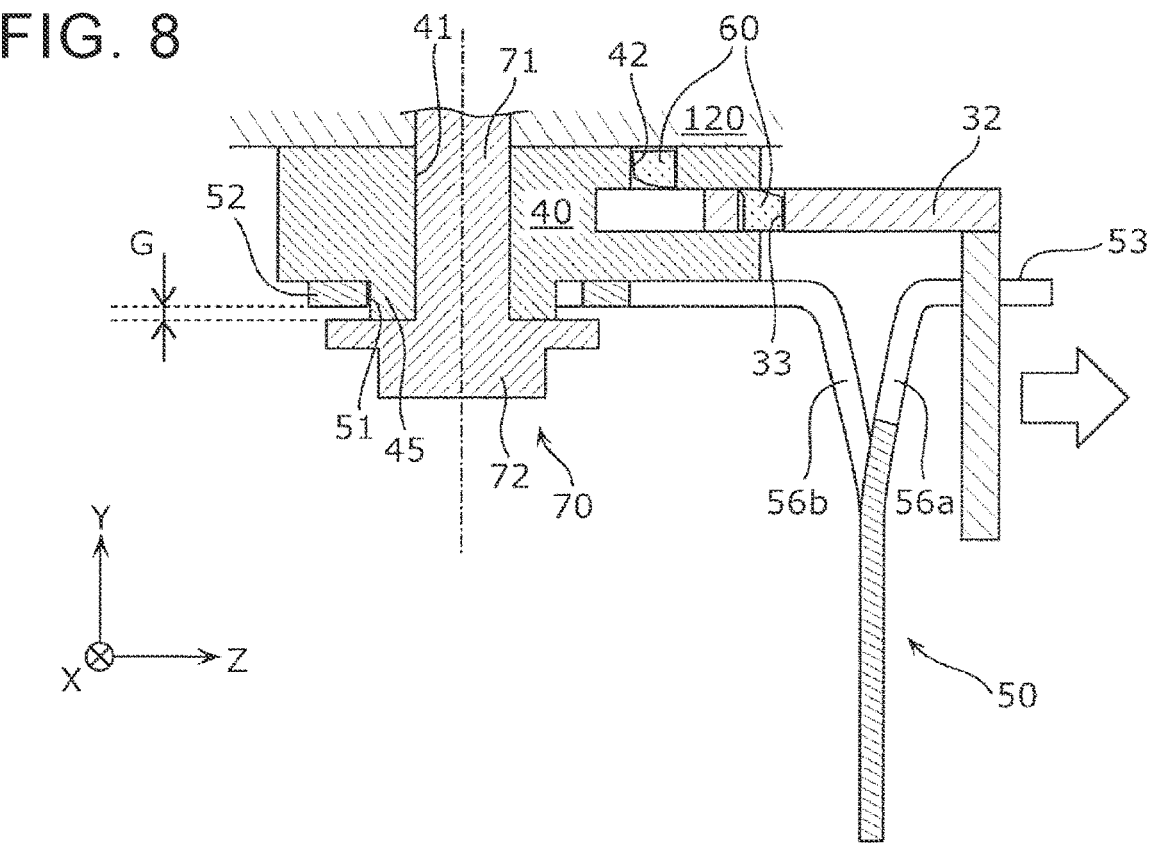
FIG. 8 is a view of the structure of the fixture member and the periphery thereof after the energy absorbing member starts being deformed.

Note that each of FIG. 6 to FIG. 8 shows the structure of the fixture member 40 and the periphery thereof in a simple cross section, and a position of the cross section is the same as the position of the cross section shown in FIG. 5. In addition, each of FIG. 6 to FIG. 8 only shows constituent elements of the fixture member 40 and constituent elements related to the fixture member 40, and thus the other constituent elements are not shown. These supplementary notes on FIG. 6 to FIG. 8 are also applied to FIG. 9 and FIG. 10, which will be described below.

As shown in FIG. 6, in the steering column 10 according to the embodiment, the shaft section 71 of the bolt 70, which fixes the fixture member 40 to a vehicle body 120, is arranged in the state of penetrating the through hole 41 of the fixture member 40 and the opening 51 of the energy absorbing member 50. Note that the vehicle body 120 is a part of a frame of the automobile on which the steering column 10 is mounted, for example. The through hole 41, through which the shaft section 71 passes, is provided in the engaging section 45, which is provided in the projected manner from the fixture member 40, and a projection length of the engaging section 45 is greater than a thickness of the peripheral edge of the opening 51 (the annular section 52) in the energy absorbing member 50. Accordingly, the head 72 of the bolt 70 is in the state of pressing the engaging section 45 in the bolt-axis direction and separating from the peripheral edge of the opening 51 (the annular section 52) in the energy absorbing member 50. That is, a clearance having a distance G (hereinafter referred to as a "clearance G") is provided between the head 72 of the bolt 70 and the annular section 52. In addition, the opening 51, in which the engaging section 45 is arranged in a penetrating manner, has such size that the clearance D is provided between the opening 51 and the engaging section 45, and the clearance D is located at the rear of the engaging section 45 in the axial direction.

When the secondary collision occurs in the above state, the outer tube 21 (see FIG. 1 and FIG. 2) is pressed forward in the axial direction. As a result, the holding member 30 (the holding bracket 31 and the fixture bracket 32) attempts to move forward in the axial direction. At this time, the coupling member 60, which is the resin pin and couples the fixture member 40 and the fixture bracket 32, starts being sheared. In addition, at initiation of shearing of the coupling member 60, the clearance D exists at the rear of the engaging section 45 in the axial direction. Thus, the opening 51 moves forward in the axial direction without being engaged with the engaging section 45. Furthermore, since the distance G exists between the head 72 of the bolt 70 and the peripheral edge of the opening 51, the annular section 52 having the opening 51 moves forward in the axial direction without receiving a fastening force by the bolt 70. That is, the opening 51 moves for the specified distance D without substantially receiving resistance from any of the other elements, and is then engaged with the engaging section 45 as shown in FIG. 7.

More specifically, after a shearing load on the coupling member 60 exceeds a peak, the opening 51 is engaged with the engaging section 45. That is, a value of the specified distance D, and a shape, size, a material, and the like of the coupling member 60 are determined in such a manner as to satisfy such a condition. Accordingly, when the holding member 30 moves during the secondary collision, the shearing load that is required to shear the coupling member 60 is first applied to the holding member 30, and then a load that causes the deformation of the energy absorbing member 50 is applied to the holding member 30. Thus, a peak load for the impact absorption during the secondary collision is substantially equal to a load that uncouples the coupling members 60 (the six resin pins in this embodiment).

Note that, for example, expression "the coupling member 60 uncouples" does not only mean the coupling member 60 is completely sheared in the case where the coupling member 60 is arranged in a state of being sheared as in this embodiment. For example, in the case where the coupling member 60 as the resin pin is deformed to such extent that the shearing load exceeds the peak, the coupling member 60 can substantially uncouple the fixture member 40 and the holding member 30 (the fixture bracket 32). In addition, the opening 51 of the energy absorbing member 50 may be engaged with the engaging section 45 of the fixture member 40 at timing after a time point of uncoupling by the coupling member 60. Accordingly, in the case where a moving distance of the fixture bracket 32 that is required for the coupling member 60 to uncouple is set as L, the distance D shown in FIG. 6 may be D≥L.

After the opening 51 is engaged with the engaging section 45 as shown in FIG. 7, the fixture bracket 32 moves forward in the axial direction. Consequently, the coupling member 60 as the resin pin is completely sheared, and the energy absorbing member 50 is modified as shown in FIG. 8. In this way, the energy absorbing member 50 absorbs the impact energy generated by the secondary collision. Note that the coupling member 60 as the resin pin may completely be sheared before the opening 51 is engaged with the engaging section 45.

As it has been described so far, the steering column 10 according to this embodiment includes: the cylindrical member 20 that holds the steering shaft 15 in such a manner as to allow the extension and the contraction thereof in the axial direction; the holding member 30 that holds the cylindrical member 20; the fixture member 40 that is fixed to the vehicle body 120; the coupling member 60 that couples the fixture member 40 and the holding member 30; and the energy absorbing member 50. The uncoupling by the coupling member 60 occurs when the holding member 30 moves forward for a specified distance in the axial direction. The energy absorbing member 50 is partially fixed to the holding member 30. The fixture member 40 has the engaging section 45, which is arranged at the position where the engaging section 45 is engaged with the opening 51 as the engaged section of the energy absorbing member 50 in the case where the holding member 30 moves forward for the specified distance or longer in the axial direction during the secondary collision.

With such a configuration, when the holding member 30 moves forward for the specified distance in the axial direction, the uncoupling by the coupling member 60 occurs. Then, at the time point onward, the engaged section (the opening 51 in this embodiment) of the energy absorbing member 50 is engaged with the fixture member 40. As a result, a time gap between uncoupling timing by the coupling member 60 and initiation timing of the deformation of the energy absorbing member 50 is generated, and thus the peak load during the impact absorbing operation becomes relatively small. In addition, in the impact absorbing operation, the energy absorbing member 50 is engaged with the engaging section 45 of the fixture member 40, which is fixed to the vehicle body 120. That is, a portion of the energy absorbing member 50 that is subjected to the engagement after the secondary collision does not move with respect to the vehicle body 120. Thus, such an engaged state is stabilized. Furthermore, in the impact absorbing operation, the part of the energy absorbing member 50 is fixed in advance to the holding member 30, which causes the deformation of the energy absorbing member 50 when moving with respect to the vehicle body 120. For such a reason, the holding member 30 and the part of the energy absorbing member 50 can be firmly joined to each other by using a specified joining method such as welding, for example. As a result, for example, such a possibility that the energy absorbing member 50 is deformed as being designed (as being estimated) during the secondary collision is increased. As described above, the steering column 10 according to this embodiment can perform the appropriate impact absorbing operation with the simple configuration.

In this embodiment, the engaging section 45 is provided in the projected manner from the fixture member 40. The engaged section corresponds to the opening 51, which is provided in the energy absorbing member 50, and in which the engaging section 45 is arranged in the penetrating manner, and the opening 51 is formed in such size that the clearance D is provided at the rear of the engaging section 45 in the axial direction. On the portion of the engaging section 45 that is exposed from the opening 51, the head 72 is arranged. The head 72 has a larger portion than the opening 51 when seen in the projected direction of the engaging section 45, and the head 72 is arranged separately from the peripheral edge of the opening 51 in the projected direction.

With such a configuration, the impact absorbing operation is performed in such a simple configuration that the engaging section 45, which is provided in the projected manner from the fixture member 40, is stuck by the opening 51 of the energy absorbing member 50. In addition, due to the provision of the head 72, during the normal time and during the impact absorbing operation, the disengagement of the opening 51 of the energy absorbing member 50 from the engaging section 45 is prevented. This stabilizes the impact absorbing operation.

In this embodiment, the head 72 is the head 72 of the bolt 70 that fastens the fixture member 40 and the vehicle body 120 to each other, so as to fix the fixture member 40 to the vehicle body 120. The engaging section 45 has the through hole 41, which causes the shaft section 71 of the bolt 70 to extend through the engaging section 45 in the projected direction. The projection length of the engaging section 45 from the fixture member 40 is greater than the thickness of the peripheral edge of the opening 51 in the plate-shaped energy absorbing member 50.

Just as described, in this embodiment, the fixture member 40 is fixed to the vehicle body 120 by the bolt 70, which extends through the through hole 41 provided in the engaging section 45 of the fixture member 40. That is, the bolt 70, which firmly fixes the fixture member 40 to the vehicle body 120, is used for the engagement of the engaging section 45 with the energy absorbing member 50. Thus, engagement strength is improved, for example. In addition, since the projection length of the engaging section 45 is greater than the thickness of the peripheral edge of the opening 51 (the annular section 52), the fastening force by the bolt 70 is not substantially applied to the energy absorbing member 50. That is, the fastening force by the bolt 70 does not hinder the uncoupling by the coupling member 60 (that is, the movement of the holding member 30). Accordingly, for example, in the case where the resin pin is used as the coupling member 60 as in this embodiment, the resin pin only needs to have such strength that the resin pin can endure the load at the time of the position adjustment of the steering wheel, for example. As a result, the peak load during the impact absorbing operation can be reduced.

The description has been made so far on the steering column 10 according to the embodiment. However, the steering column 10 may include a fixture member and an energy absorbing member in a different mode from the mode shown in FIG. 1 to FIG. 4. A description will hereinafter be centered on different points from the above embodiment in modified embodiments of the fixture member and the energy absorbing member.

First Modified Embodiment

Figure 9:
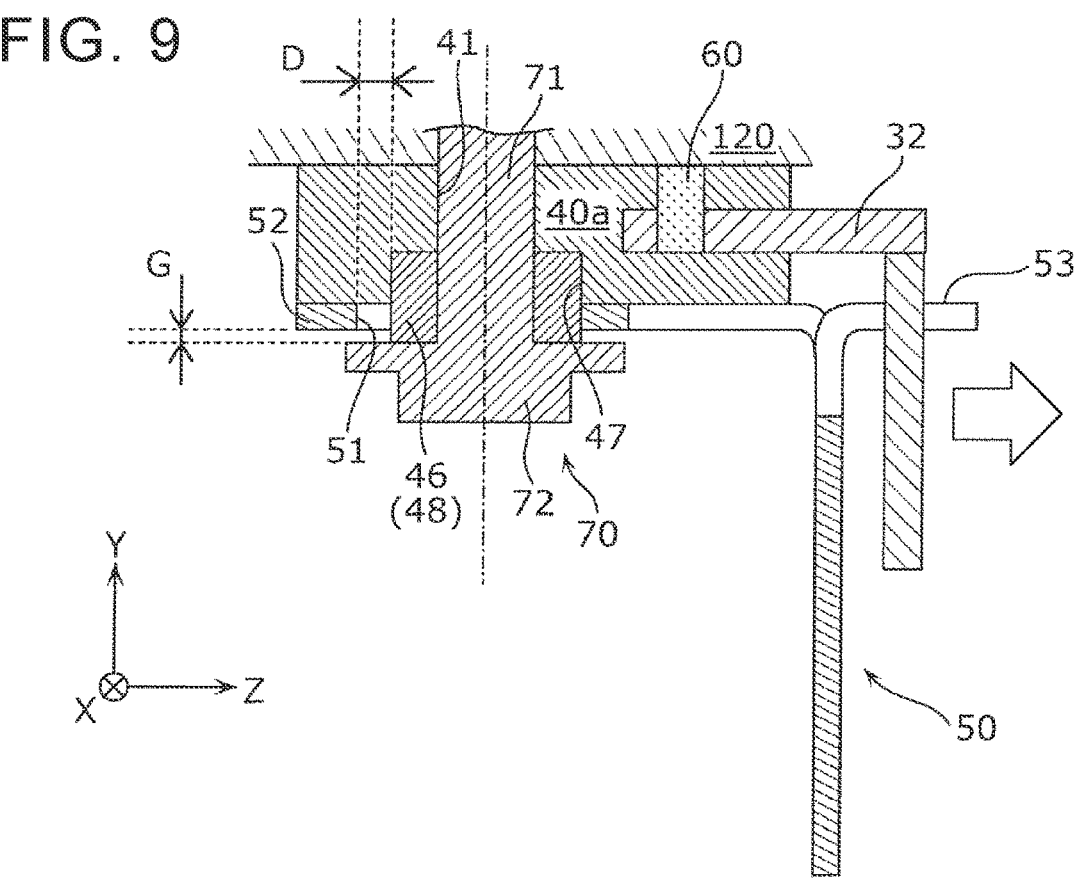
FIG. 9 is a view of a structure of a fixture member according to a first modified embodiment of the embodiment and a periphery thereof.

FIG. 9 is a view of a structure of a fixture member 40a according to a first modified embodiment of the embodiment and a periphery thereof. In regard to the fixture member 40a according to this modified embodiment shown in FIG. 9, an engaging section 46 is formed when a member manufactured as a separate member from the fixture member 40a is attached to the fixture member 40a. More specifically, the engaging section 46 is formed of a circular tube member 48 that is attached to an attachment hole 47 provided in the fixture member 40a such that a part of the circular tube member 48 in a tube axial direction is projected from the fixture member 40a. The shaft section 71 of the bolt 70 is arranged in such a manner as to extend through the circular tube member 48 in the tube axial direction. That is, the part of the through hole 41, which causes the shaft section 71 to penetrate, in the fixture member 40a is formed of the circular tube member 48.

With such a configuration, the circular tube member 48, which forms the engaging section 46 in the projected shape, is arranged as the separate member in the metallic fixture member 40a. Accordingly, for example, when compared to the fixture member 40 according to the above embodiment that integrally includes the engaging section 45 in the projected shape, the fixture member 40a can easily be manufactured. In addition, a projection length of the engaging section 46 from the fixture member 40a can be changed by changing a length of the circular tube member 48 in the tube axial direction. Thus, for example, when the thickness of the peripheral edge of the opening 51 in the energy absorbing member 50 is changed, the projection length of the engaging section 46 can easily be changed.

Second Modified Embodiment

Figure 10:
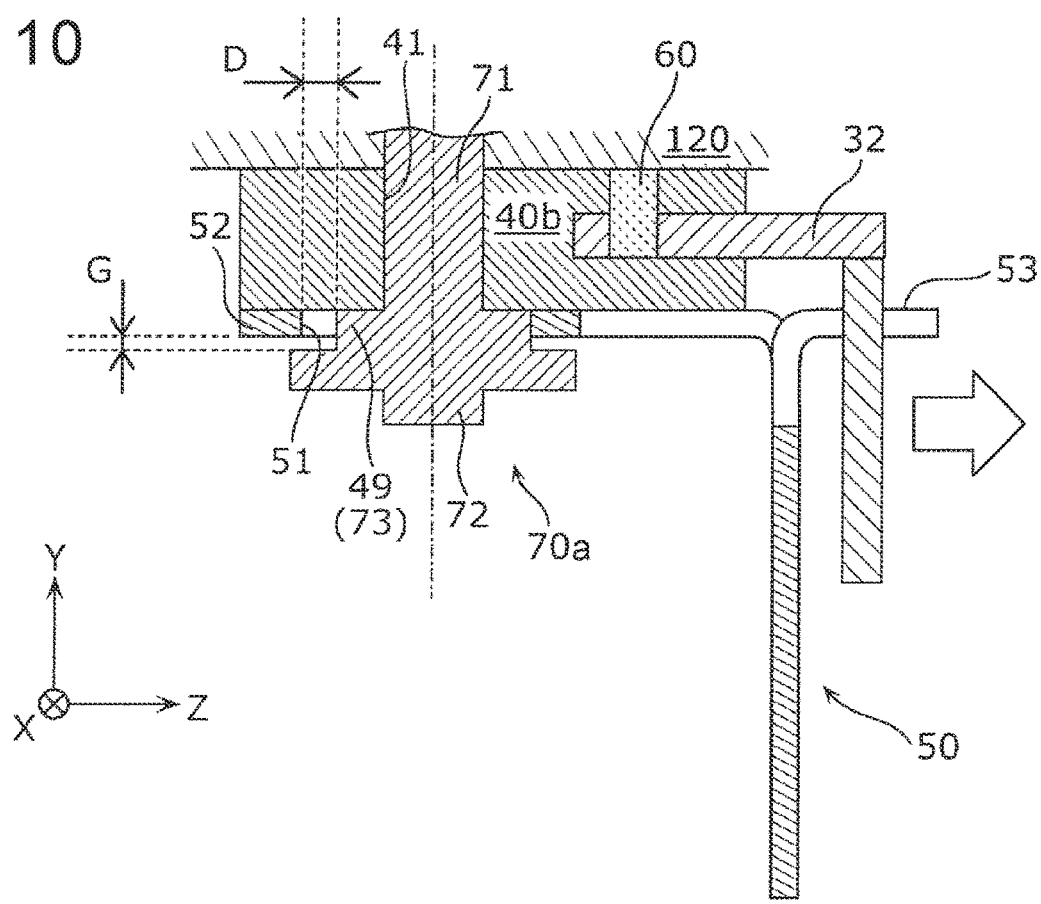
FIG. 10 is a view of a structure of a fixture member according to a second modified embodiment of the embodiment and a periphery thereof.

FIG. 10 is a view of a structure of a fixture member 40b according to a second modified embodiment of the embodiment and a periphery thereof. The fixture member 40b according to this modified embodiment shown in FIG. 10 is fixed to the vehicle body 120 by a stepped bolt 70a, and a step 73 of the stepped bolt 70a as a separate member from the fixture member 40b is provided as an engaging section 49.

That is, in this modified embodiment, the engaging section 49 is the step 73 of the stepped bolt 70a that fastens the fixture member 40b and the vehicle body 120 to each other, so as to fix the fixture member 40b to the vehicle body 120. In other words, the head 72 that is provided in an exposed portion of the engaging section 49 from the opening 51 and has a larger portion than the opening 51 is the head 72 of the stepped bolt 70a. In addition, a thickness of the step 73 in the bolt-axis direction is greater than the thickness of the peripheral edge of the opening 51 in the plate-shaped energy absorbing member 50.

With such a configuration, processing to provide an engaging section in a projected shape in the metallic fixture member 40b is unnecessary, and a surface on the energy absorbing member 50 side of the fixture member 40b can be flat. In addition, since the step 73 of the stepped bolt 70a is used as the engaging section 49, the distance of the clearance D in FIG. 10 can be changed by replacing the stepped bolt 70a (by changing to the other stepped bolt 70a having the step 73 in different size). For such a reason, an amount of the time gap between the uncoupling timing by the coupling member 60 and the initiation timing of the deformation of the energy absorbing member 50 can be adjusted by replacing the stepped bolt 70a, for example.

Third Modified Embodiment

Figure 11:
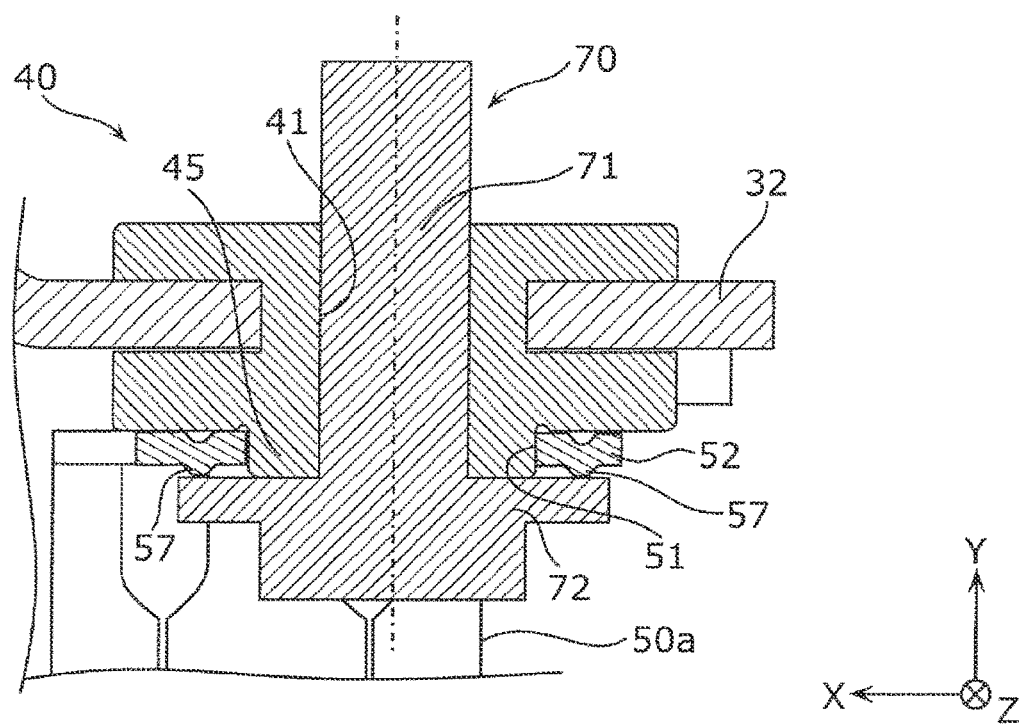
FIG. 11 is a view illustrating characteristics of an energy absorbing member according to a third modified embodiment of the embodiment.

FIG. 11 is a view illustrating characteristics of an energy absorbing member 50a according to a third modified embodiment of the embodiment. Note that FIG. 11 shows a cross section of the fixture member 40 and a periphery thereof in an X-Y plane that passes the axis of the bolt 70.

In this modified embodiment, the engaging section 45 of the fixture member 40 is arranged in a state of penetrating the opening 51 of the energy absorbing member 50a, and the peripheral edge of the opening 51 is located between the head 72 of the bolt 70 and the fixture member 40. In regard to such a configuration, this modified embodiment is the same as the above embodiment.

Meanwhile, in this modified embodiment, the peripheral edge of the opening 51 in the energy absorbing member 50a is formed with a convex section 57 that is projected toward the head 72. In such a point, this modified embodiment differs from the above embodiment.

Just as described, in this modified embodiment, the annular section 52 having the opening 51 is configured to have a thickness fitted to the clearance between the head 72 of the bolt 70 and the fixture member 40 (the clearance G in FIG. 6) and have the convex section 57 that is in point contact with the head 72 of the bolt 70.

That is, the annular section 52, which has the opening 51, is arranged in such a manner as to hardly receive the fastening force by the bolt 70, and the movement of the annular section 52 in the bolt-axis direction is restricted by the convex section 57. Accordingly, the head 72 of the bolt 70 does not substantially hinder the forward movement of the annular section 52 in the axial direction (in the positive Z-axis direction) at the time of the engagement of the opening 51 with the engaging section 45, and thus rattling of the annular section 52 is suppressed. In this way, for example, it is possible to suppress abnormal noise that is produced by the rattling of the annular section 52, damage to the annular section 52, or the like without degrading the stability of the impact absorbing operation.

Note that, although the two convex sections 57 are formed on the peripheral edge of the opening 51 in this modified embodiment, the at least one convex section 57 may be formed. In addition, a concave section is formed on a back side of the convex section 57 in the annular section 52. However, such a concave section may not be formed. That is, the back side of the convex section 57 in the annular section 52 may have a flat shape. Furthermore, the convex section 57 may be formed on a surface on the fixture member 40 side of the annular section 52. That is, the convex section 57 may be provided as a projected portion toward the fixture member 40 on the peripheral edge of the opening 51. Also, in such a case, the annular section 52, which has the opening 51, can be arranged in such a manner as to hardly receive the fastening force by the bolt 70, and the movement of the annular section 52 in the bolt-axis direction is restricted by the convex section 57.

Fourth Modified Embodiment

Figure 12:
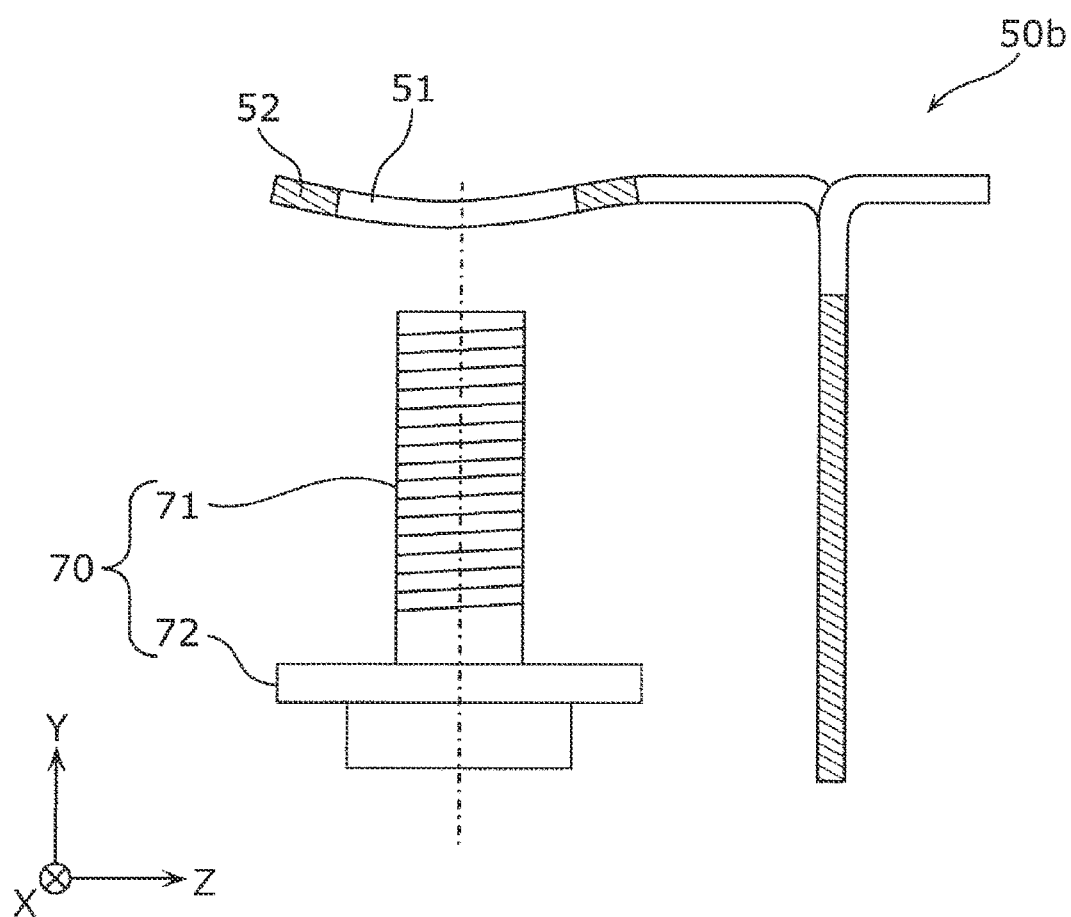
FIG. 12 is a view illustrating characteristics of an energy absorbing member according to a fourth modified embodiment of the embodiment.

FIG. 12 is a view illustrating characteristics of an energy absorbing member 50b according to a fourth modified embodiment of the embodiment. In order to clarify a structural relationship between the energy absorbing member 50b and the bolt 70, FIG. 12 only shows the energy absorbing member 50b and the bolt 70. In addition, the energy absorbing member 50b is shown in the cross-sectional shape at the same position as in FIG. 5, and the bolt 70 is shown in a side view of a state where the bolt 70 separates from the energy absorbing member 50b.

In this modified embodiment, the annular section 52, which has the opening 51, in the energy absorbing member 50b has a curved shape to be projected toward the head 72. Accordingly, in the case where the engaging section 45 of the fixture member 40 is arranged in the state of penetrating the opening 51 and the fixture member 40 is fixed to the vehicle body 120 by the bolt 70 (for example, see FIG. 6), the annular section 52, which is curved to be projected toward the head 72, comes in line or point contact with the head 72 of the bolt 70.

That is, the annular section 52, which has the opening 51, can be arranged in such a manner as to hardly receive the fastening force by the bolt 70, and a small area of the annular section 52 comes in contact with each of the head 72 and the fixture member 40. In this way, the movement of the annular section 52 in the bolt-axis direction can be restricted. Accordingly, the head 72 of the bolt 70 does not substantially hinder the forward movement of the annular section 52 in the axial direction (in the positive Z-axis direction) at the time of the engagement of the opening 51 with the engaging section 45, and thus the rattling of the annular section 52 is suppressed. In this way, for example, it is possible to suppress the abnormal noise that is produced by the rattling of the annular section 52, the damage to the annular section 52, or the like without degrading the stability of the impact absorbing operation.

Note that the annular section 52 may be bent to be projected toward the head 72. In this way, the contact area of the annular section 52 with the head 72 is further reduced. In addition, the annular section 52 may be curved or bent to be projected toward the fixture member 40. That is, the annular section 52 may be curved or bent in a reverse direction from the direction shown in FIG. 12. Also, in such a case, the annular section 52, which has the opening 51, can be arranged in such a manner as to hardly receive the fastening force by the bolt 70. Furthermore, due to the contact of the annular section 52 with both of the head 72 and the fixture member 40, the movement of the annular section 52 in the bolt-axis direction is suppressed.

Other Embodiments

The description has been made so far on the steering column according to the disclosure on the basis of the embodiment and the modified embodiments thereof. However, the disclosure is not limited to the embodiment and the modified embodiments described above. Various modifications that are conceived by persons skilled in the art and are made to the embodiment and the modified embodiments described above, and aspects that are constructed by combining the plural constituent elements described above are also included in the scope of the disclosure unless departing from the gist of the disclosure.

For example, in the steering column 10 according to the embodiment, the outer tube 21 and the inner tube 22 each has the cylindrical shape. However, the shape of each of these outer tube 21 and inner tube 22 is not limited to the cylindrical shape. For example, a cross-sectional shape of each of the outer tube 21 and the inner tube 22 that is orthogonal to the axial direction may be a polygonal shape, an oval shape, an elongated circular shape, or the like.

In this embodiment, the energy absorbing member 50 is the plate-shaped metallic member. However, the shape and the type of the energy absorbing member provided in the steering column 10 are not particularly limited. For example, a wavy metallic plate or a metallic tube formed in an accordion shape may be adopted as the energy absorbing member provided in the steering column 10.

The coupling member 60 may be a member other than the resin pin. For example, the coupling member 60 may be formed by a resinous or metallic annular member that couples the fixture member 40 and the fixture bracket 32.

The engagement structure between the fixture member 40 and the energy absorbing member 50 is not particularly limited. For example, the deformation of the energy absorbing member 50 may be initiated when a projection provided in the energy absorbing member 50 is engaged with a part of the fixture member 40.

For example, the head 72 of the bolt 70 may function as an engaging section that is provided in a projected manner from the fixture member 40. In such a case, for example, a screw hole is provided in the head 72 of the bolt 70, and another bolt having a larger head than the head 72 is screwed to the screw hole. In this way, the other bolt can function to prevent the opening 51 of the energy absorbing member 50 from being disengaged from the engaging section (the head 72).

The steering column according to the disclosure is useful as a steering column that is provided in the vehicle such as the automobile and capable of the position adjustment of the steering wheel.

What is claimed is:

1. A steering column provided in a vehicle body, the steering column comprising:
    a cylindrical member that holds a steering shaft in such a manner as to allow extension and contraction of the steering shaft in an axial direction;
    a holding member that holds the cylindrical member;
    a fixture member that is fixed to the vehicle body;
    a coupling member configured to couple the fixture member and the holding member, and the coupling member being configured to uncouple the fixture member and the holding member when the holding member moves in a forward direction for a specified distance in the axial direction; and an energy absorbing member that is partially fixed to the holding member, wherein the fixture member has an engaging section arranged at a position where the engaging section is engaged with an engaged section of the energy absorbing member when the holding member moves in the forward direction for the specified distance or longer in the axial direction during a secondary collision, such that the energy absorbing member is deformed in the forward direction to separate the engaged section of the energy absorbing member from a fixed section of the energy absorbing member that is fixed to the holding member, and the energy absorbing member absorbs impact energy during the secondary collision when the energy absorbing member is deformed.

2. The steering column according to claim 1, wherein the engaging section is provided in such a manner as to be projected from the fixture member, the engaged section is an opening provided in the energy absorbing member, the engaging section is arranged in such a manner as to extend through the opening, the opening is in such size that a clearance is provided between the opening and a rear side of the engaging section in the axial direction, and on a portion of the engaging section that is exposed from the opening, a head that has a larger portion than the opening when seen in a projected direction of the engaging section is provided, and the head is arranged separately from a peripheral edge of the opening in the projected direction.

3. The steering column according to claim 2, wherein the head is a head of a bolt that fixes the fixture member to the vehicle body by fastening the fixture member and the vehicle body, the engaging section has a through hole that causes a shaft section of the bolt to extend through the engaging section in the projected direction, the energy absorbing member has a plate shape, and a projection length of the engaging section from the fixture member is greater than a thickness of the peripheral edge of the opening in the energy absorbing member.

4. The steering column according to claim 3, wherein the engaging section has a circular tube member, the circular tube member is provided in an attachment hole provided in the fixture member such that a part of the circular tube member in a tube axial direction is projected from the fixture member, and the shaft section of the bolt is arranged to extend through the circular tube member in the tube axial direction.

5. The steering column according to claim 2, wherein the engaging section is a step of a stepped bolt that fixes the fixture member to the vehicle body by fastening the fixture member and the vehicle body, the head is a head of the stepped bolt, the energy absorbing member has a plate shape, and a thickness of the step in an axial direction of the stepped bolt is greater than a thickness of the peripheral edge of the opening in the energy absorbing member.

6. The steering column according to claim 2, wherein a convex section that is projected toward the head or the fixture member is formed on the peripheral edge of the opening in the energy absorbing member.

7. The steering column according to claim 2, wherein the energy absorbing member includes an annular section having the opening, the annular section has a curved or bent shape to be projected toward the head or the fixture member.

8. The steering column according to claim 1, wherein the engaged section is an annular opening of the energy absorbing member, and a fastener that fixes the fixture member to the vehicle body extends through the annular opening.

9. The steering column according to claim 1, wherein the energy absorbing member includes a first section extending in a first direction different from the forward direction, a second section extending in the first direction, and a connecting portion extending in the first direction that connects the first section to the second section, and the connecting section is configured to rupture when the energy absorbing member is deformed in the forward direction.

* * * * *